United States Patent
Meseck et al.

(10) Patent No.: US 7,155,534 B1
(45) Date of Patent: Dec. 26, 2006

(54) ARRANGEMENT FOR AGGREGATING MULTIPLE ROUTER CONFIGURATIONS INTO A SINGLE ROUTER CONFIGURATION

(75) Inventors: Andrew Baker Meseck, Louisville, CO (US); Ravikumar Eswaran, Tamilnadu (IN); Srinivas Gudipudi, Andhra Pradesh (IN); Vanaja Ravi, Chennai (IN); Wayne Roman Roiger, Golden Valley, MN (US)

(73) Assignee: Cisco Technology, Inc., San Jose, CA (US)

( * ) Notice: Subject to any disclaimer, the term of this patent is extended or adjusted under 35 U.S.C. 154(b) by 800 days.

(21) Appl. No.: 10/262,953

(22) Filed: Oct. 3, 2002

(51) Int. Cl.
*G06F 15/173* (2006.01)
*G06F 15/177* (2006.01)

(52) U.S. Cl. ............... 709/238; 709/220; 709/240; 709/244

(58) Field of Classification Search ............ 709/238, 709/220, 240, 244
See application file for complete search history.

(56) References Cited

U.S. PATENT DOCUMENTS

| | | | |
|---|---|---|---|
| 6,295,276 B1 * | 9/2001 | Datta et al. ............ 370/218 |
| 6,493,341 B1 * | 12/2002 | Datta et al. ............ 370/392 |
| 6,631,416 B1 * | 10/2003 | Bendinelli et al. ......... 709/227 |
| 6,976,087 B1 * | 12/2005 | Westfall et al. ........... 709/238 |
| 6,996,628 B1 * | 2/2006 | Keane et al. ............ 709/238 |

* cited by examiner

Primary Examiner—Saleh Najjar
Assistant Examiner—V. Korobov
(74) Attorney, Agent, or Firm—Leon R. Turkevich (57) ABSTRACT

A computer-based system is configured for aggregating multiple router configurations into a single router configuration, enabling transfer of functionality from routers configured according to the respective router configurations to a single router having the single router configuration. The system includes a configuration determination resource configured for determining the router configurations from the multiple routers, and a device analyzer resource configured for determining for each router configuration a corresponding candidate configuration to be utilized in the single router configuration. Any conflict detected between the router configuration and the corresponding candidate configuration is managed by a conflict resolution resource, which determines the availability of a resolved configuration in the single router configuration to replace the corresponding router configuration. An router configuration aggregation resource is configured for generating the single router configuration based on the determined candidate configurations and resolved configurations.

40 Claims, 8 Drawing Sheets

Figure 1

```
!
interface FastEthernet0/0
ip address 10.64.117.13 255.255.255.192
ip nat outside
speed auto
!
!                    ⟋42
interface Serial 0
no shutdown
description connected to Internet
ip address 10.22.18.8 255.255.0.0  ←—44
ip access-group 101 in  ←—48
encapsulation ppp  ←—46
!
controller T1 1.0
framing esf
linecode b8zs
pri-group timeslots 1-10,24
!
!                    ⟋50
! Access Control List 101
!
access-list 101 deny ip 10.1.1.0 0.0.0.255 any
access-list 101 permit udp any 10.1.1.0 0.0.0.255 eq
domain
access-list 101 permit tcp any 10.1.1.0 0.0.0.255 eq bgp
!
```

```xml
<?xml version=" encoding="ISO-8859-1"?>
<Router_Config>
   <Interface>
      <IntfcType>FastEthernet</IntfcType>          ← 62
      <slot>0</slot>  ← 62
      <port>0</port> ← 62
      <INTFC_CMD>
                                                    ← 62
         <ipaddr>10.64.117.13</ipaddr>
  64 ─── <SubnetMask>255.255.255.192</SubnetMask>  ← 62
         <natDir>outside</natDir> ← 62
         <speed>auto</speed>
                                  ← 62
      </INTFC_CMD>
   </Interface>

<Interface>
      <IntfcType>Serial</IntfcType>
      <slot>0</slot>
      <port></port>
      <INTFC_CMD>
        <shutdown>no</shutdown>
        <ipaddr>10.22.18.8</ipaddr>
        <SubnetMask>255.255.0.0</SubnetMask>
        <AccessGroupInsideId>101</AccessGroupInsideId>
      </INTFC_CMD>
   </Interface>

<Controller>
      <cntrlType>T1</cntrlType>
      <slot>1</slot>
      <port>0</port>
      <CNTRL_CMD>
          <framing>esf</framing>
          <linecode>b8zs</linecode>
              :
```

```
    ⋮
     </CNTRL_CMD>
   </Controller>
</Router_Config>

<AccessList>
        <AccessListId>101</AccessListId>
            <Policy1>
                <TrafficDirection>deny</TrafficDirection>
                <L3Protocol>ip</L3Protocol>
                <SourceAddress>10.1.1.0</SourceAddress>
                <SourceMask>0.0.0.255</SourceMask>
                <PortNumber> </PortNumber>
                <Protocol>any</Protocol>
            </Policy1>
            <Policy2>
                <TrafficDirection>permit</TrafficDirection>
                <L3Protocol>udp</L3Protocol>
                <SourceAddress>10.1.1.0</SourceAddress>
                <SourceMask>0.0.0.255</SourceMask>
                <PortNumber> </PortNumber>
                <Protocol>domain</Protocol>
            </Policy2>
            <Policy3>
                <TrafficDirection>deny</TrafficDirection>
                <L3Protocol>tcp</L3Protocol>
                <SourceAddress>10.1.1.0</SourceAddress>
                <SourceMask>0.0.0.255</SourceMask>
                <PortNumber> </PortNumber>
                <Protocol>bgp</Protocol>
            </Policy3>
```

```xml
<AggregationRouter>C10008</AggregationRouter>
    <Slots>8</Slots>
    <IOSVersion>12.0 above</IOSVersion>
  <DirectMapLineCards>                    <!-- 72a -->
        <card>Channelized T3</card>
        <card>Channelized OC-12</card>
        <card>Channelized OC-12 ATM</card>

...
  </DirectMapLineCards>
     <SubscriberAggregattbleInterfaces>   <!-- 72b -->
        <SourceInterface>DS1</SourceInterface>
        <TargetInterface>DS3</TargetInterface>
        <SourceInterface>T1</SourceInterface>
        <TargetInterface>T3<TargetInterface>

...
    </SubscriberAggregatatbleInterfaces>

<AggregatabaleTrunkInterfaces>         <!-- 72c -->
        <SourceInterface>OC3</SourceInterface>
        <TargetInyterface>OC12</TargetInterface>
    </AggregatableTrunkInterfaces>

<AggegatableCommandKeyValuePairs>      <!-- 72d -->
        <AccessList></AccessList>
        <RoutingMap></RoutingMap>

...
    </AggegatableCommandKeyValuePairs>

<UnSupportedCommands>                  <!-- 72e -->
74a -->  <framerelay>
            <cmd>frame-relay adaptive-shaping</cmd>
            <cmd>frame-relay bc</cmd>
         </framerelay>
         <PPP>
74b -->     <cmd>ppp bridge appletalk</cmd>
            <cmd>ppp bridge ip</cmd>
         </PPP>
         <MLPPP>
74c -->     <cmd>ppp multilink fragment-delay</cmd>
            <cmd>ppp multilink fragmentation</cmd>
         </MLPPP>
    </UnSupportedCommands>
</C10008>
```

```
<C7600>
    <IOSVersion>12.0 above</IOSVersion>
    <LineCards>
        <card>Channelized T1</card>
        <card>Channelized T3</card>
        <card>Channelized OC-12</card>
        <card>ISDN BRI</card>
    </LineCards>
    <UnSupportedCommands>
    </UnSupportedCommands>
</7600>
```

ARRANGEMENT FOR AGGREGATING MULTIPLE ROUTER CONFIGURATIONS INTO A SINGLE ROUTER CONFIGURATION

BACKGROUND OF THE INVENTION

1. Field of the Invention

The present invention relates to aggregation (i.e. combination) of multiple router configurations from respective routers, configured for routing data at first data rates (e.g., OC-3), to a higher-performance router configured for routing the data at a second data rate (e.g., OC-12) at least equal to the aggregated data rate of the first routers.

2. Description of the Related Art

The growth of new services on the Internet (e.g., voice, video, etc.) that require high bandwidth and high quality of service (QoS) performance constraints has caused many network service providers to reach the capacity of their existing network infrastructure. Hence, the development of newer and more sophisticated network devices has induced network service providers to upgrade existing network devices with the newer, higher-performance network devices. In particular, the newer, high-performance routers that satisfy network service providers' demands for high density, service rich networks often have a higher capacity and enhanced operations that enable the network service provider to offer data services at a lower cost. Such highly-scalable routers may be designed to provide leased line aggregation at the edge of a service provider's network. A typical example involves a service provider that replaces its mid range routers at the network edge with a high-performance router that can aggregate the subscriber lines managed by the mid range routers into a single, high density port in the high-performance router.

However, the migration from multiple, mid range routers to a single, high-performance router often requires that the new, high-performance router be configured to preserve the integrity of the existing configurations of the mid range routers deployed in the network. Hence, a network engineer (i.e., administrator) typically will need to spend hours manually configuring the new network topology for the new, high-performance router, to ensure the new high-performance router does not lose any of the existing functionality provided by the existing routers. For example, multiple mid range routers that lease DS1 and DS3 channels to subscribers via prescribed time slots may be replaced with a single high-performance router having a line card that can terminate hundreds of DS1 circuits, all carried within a single fiber; in such a case, difficulties may arise in attempting to manually migrate the channel time slots from the multiple mid range routers to a single high density channel in the new high-performance router. In addition, the attempt to avoid the loss of existing functionality during migration can be tedious in cases where the new high-performance router does not support all of the same interfaces as the mid range routers. For example, the new high-performance router may not support interfaces such as Integrated Services Digital Network (ISDN), High Speed Serial Interface (HSSI), or Fiber Distributed Data Interface (FDDI). Hence, manual migration of interface configurations is not only tedious and time consuming, but also increases chances of error.

SUMMARY OF THE INVENTION

There is a need for an arrangement that enables automated migration of router configurations from multiple routers to a single router with minimal manual intervention.

There also is a need for an arrangement that enables automated migration of router configurations from multiple routers to a single router, where router configuration incompatibilities between one of the multiple routers and the single router can be resolved automatically.

These and other needs are attained by the present invention, where a computer-based system is configured for aggregating multiple router configurations into a single router configuration, enabling transfer of functionality from routers configured according to the respective router configurations to a single router having the single router configuration. The system includes a configuration determination resource, configured for determining the router configurations from the multiple routers, and a device analyzer resource configured for determining for each router configuration, a corresponding candidate configuration to be utilized in the single router configuration. Any conflict detected between the router configuration and the corresponding candidate configuration is managed by a conflict resolution resource, which determines the availability of a resolved configuration in the single router configuration to replace the corresponding router configuration. An router configuration aggregation resource is configured for generating the single router configuration based on the determined candidate configurations and resolved configurations. Hence, a high-performance router can be configured with the single router configuration that preserves the functionality of the multiple router configurations, with little or no manual intervention.

One aspect of the invention provides a method in an executable system configured for accessing routers according to Internet Protocol (IP). The method includes determining, for each of an identified group of routers, a corresponding group of router configurations used for providing a corresponding group of router operations, and determining, for each router configuration, whether a corresponding candidate configuration is available for use by an aggregate router configured for aggregating the router operations for the identified group of routers. The method also includes detecting whether a conflict exists between one of the router configurations and the corresponding candidate configuration, and selectively determining an availability of a resolved configuration that resolves the conflict for the one router configuration, enabling execution of the corresponding router operation by the aggregate router. The method also includes generating a single router configuration, for use by the aggregate router, in aggregating the router operations, based on the determined candidate configurations and the resolved configurations.

Another aspect of the present invention provides an executable system configured for accessing routers according to Internet Protocol (IP). The system includes a router configuration parser configured for determining, for each of an identified group of routers, a corresponding group of router configurations used for providing a corresponding group of router operations, a device analyzer, a conflict resolution resource, and an aggregation resource. The device analyzer is configured for determining, for each router configuration, whether a corresponding candidate configuration is available for use by an aggregate router configured for aggregating the router operations for the identified group of routers. The device analyzer also is configured for detecting whether a conflict exists between one of the router configurations and the corresponding candidate configuration. The conflict resolution resource is configured for selectively determining an availability of a resolved configuration that resolves the conflict for the one router configuration, enabling execution of the corresponding router operation by the aggregate router. The aggregation resource is configured for generating a single router configuration, for use by the aggregate router in aggregating the router operations, based on the determined candidate configurations and the resolved configurations.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
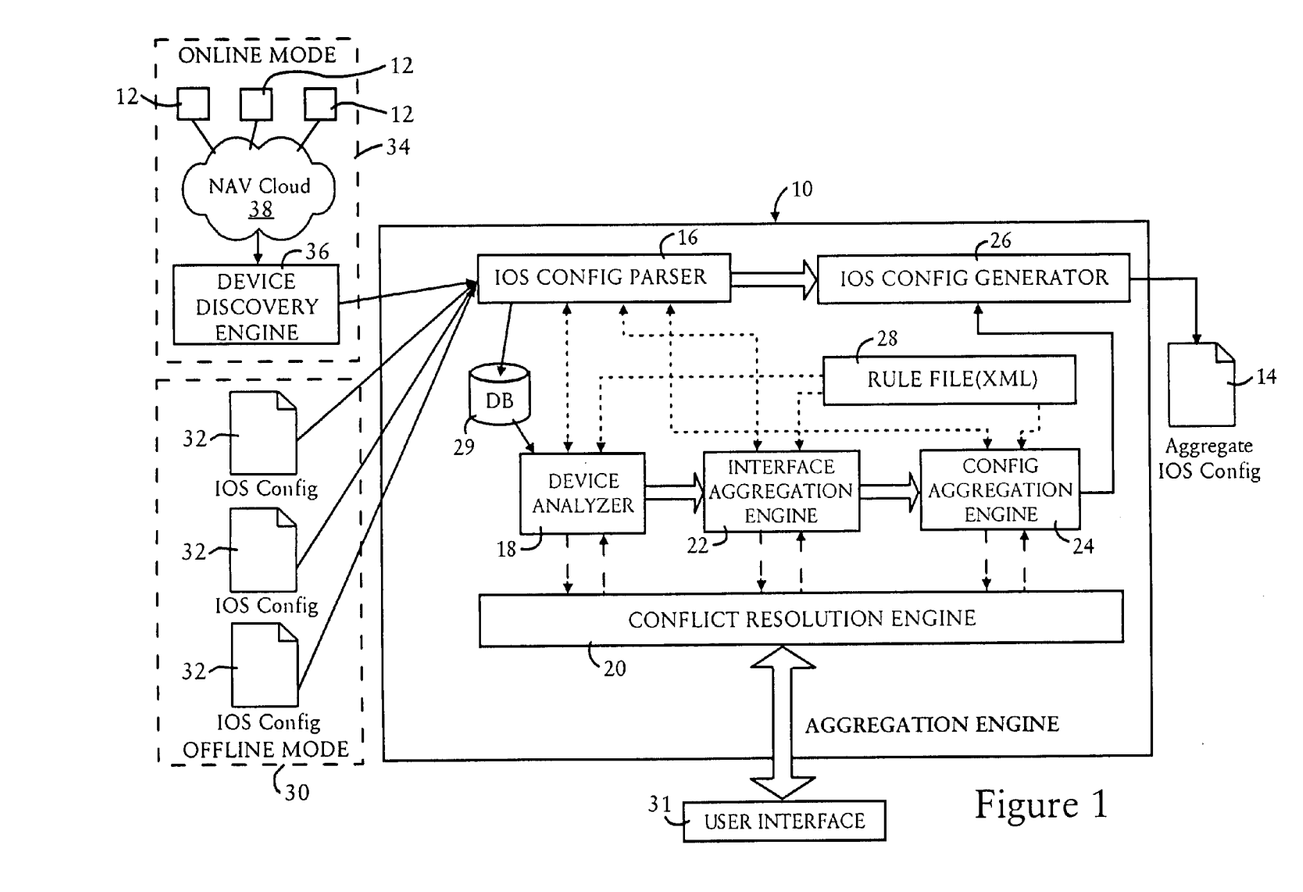
FIG. 1 is a diagram illustrating a migration system configured for aggregating multiple router configurations into a single router configuration, according to an embodiment of the present invention.

FIG. 1 is a diagram illustrating a migration system 10, also referred to as an aggregation engine, configured for aggregating multiple router configurations for multiple routers 12, into a single router configuration 14 that can be used by a single aggregate router, according to an embodiment of the present invention. The migration system 10 is configured as a processor-based executable system configured for executing executable code that may be stored on a computer-readable medium; hence, the components illustrated in FIG. 1 represent the operational components that are implemented upon execution of the executable code.

The migration system 10 includes a configuration parser 16, a device analyzer 18, a conflict resolution resource (i.e., "engine") 20, an interface aggregation engine 22, a configuration aggregation engine 24, a configuration generator 26, and a rule file 28. Note that the interface aggregation engine 22, the configuration aggregation engine 24, and the configuration generator 26 may be integrated into a single aggregation resource configured for generating a single router configuration 14. The single router configuration 14 is used by an aggregate router 130, illustrated in FIG. 7, to aggregate the router operations of the multiple routers 12 as illustrated in FIG. 1 and/or FIG. 6.

Figure 4A:
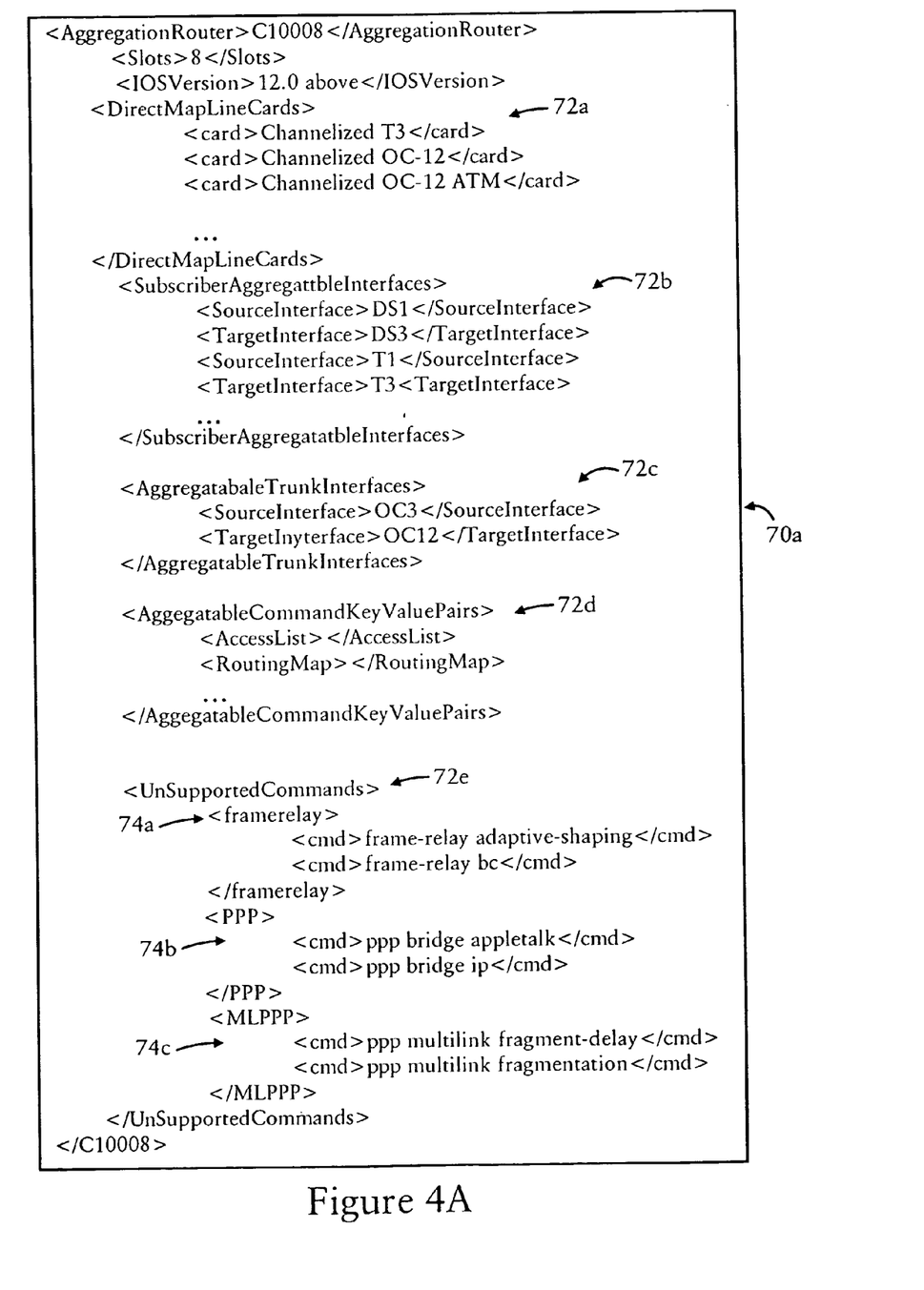
FIGS. 4A and 4B are diagrams summarizing a XML-based rule file used by the system of FIG. 1.
Figure 4B:
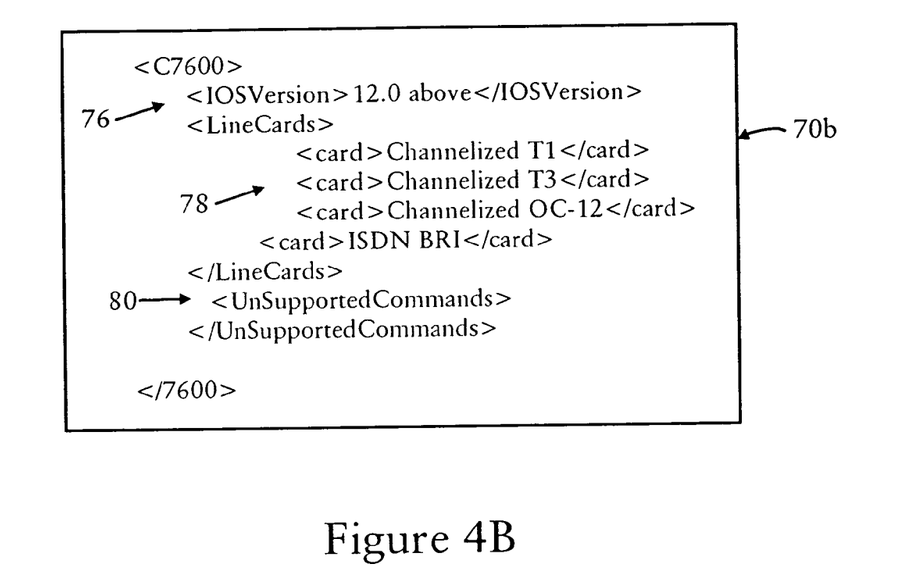

The rule file 28 is configured for storing extensible markup language (XML) documents that specify attributes for various rules, operations, parsed configurations, etc. In particular, the XML documents stored in the rule file 28, illustrated in FIGS. 4A and 4B, are utilized by the different components of the aggregation engine 10 in making decisions. For example, the rule file 28 will include information such as: the interfaces in the existing routers 12 can be aggregated to an available interface in the aggregate router 130; any interfaces that are not supported in the aggregate router 130 (e.g., ISDN, HSSI interfaces); routing protocols supported by the aggregate router 130; and what software revisions are required for aggregation of each of the existing routers 12.

The configuration parser 16, also referred to as a router configuration parser, is configured for retrieving the router configurations from each of the routers 12 that are used by the respective routers 12 and providing the corresponding router operations. As illustrated in FIG. 1, the configuration parser 16 is configured for obtaining the router configurations either in an off-line mode 30, where each corresponding router configuration file 32 is read from a tangible medium, for example a hard disk configured for centrally storing the router configurations, or an online mode 34. Hence, the configuration parser 16 may utilize a network discovery resource 36 to determine the identity of the routers 12 within the IP network 38, enabling the configuration parser 16 to query each of the routers 12 for their router configurations. Hence, the configuration parser 16 can access the router configurations from each corresponding identified router 12 via the device discovery resource 36. According to the disclosed embodiment, the routers 12 and the aggregate router configuration 14 utilize the commercially-available Cisco IOS® Software, available from Cisco Systems, San Jose Calif. Examples of the routers 12 include the commercially available 7XXX series routers from Cisco Systems, including the 7200 series (e.g., 7202, 7204, 7206), 7500 series (e.g., 7505, 7507, 7513, 7576), etc. An example of the aggregate router 130 to be used includes the 10000 series of routers from Cisco systems, including the commercially available 10005 and 10008 routers.

The configuration parser 16, upon determining the router configuration for any one of the routers 12, either using the off-line mode 30 of reading a configuration file 32, or accessing the group of router configurations from each corresponding identified router 12 via the network 38, parses the router configuration information and stores the configuration parameters in a local database as key value pairs.

Router configurations in general can be subdivided into router interface configurations and non-interface configurations. As described herein, router interface configurations refer to configurations used to control the IP-based router interfaces for transfer of IP data. Non-interface configurations are used to control other router operations, for example telnet and enable passwords, and routing protocols. In particular, each of the low end routers 12 may have a different telnet and enable password, and the high end router configuration 14 may retain the password of one of the low end routers or define a new telnet and enable password for the system; hence, the aggregation of multiple telnet and enable passwords for global configuration of the aggregate router may require conflict resolution of passwords.

In the case of routing protocols, for example execution of Border Gateway Protocol (BGP) per the Internet Engineering Task Force (IETF) Request for Comments (RFC) 1771, two routers 12 executing BGP protocol may use the same autonomous system (AS) number for different neighbors. In this case, the system 10 is configured for resolving the conflict and suggesting how the BGP protocol should be configured in the router configuration 14. Hence, the disclosed embodiment is capable of aggregating router configurations, including router interface configurations and non-interface configurations.

Figure 2:
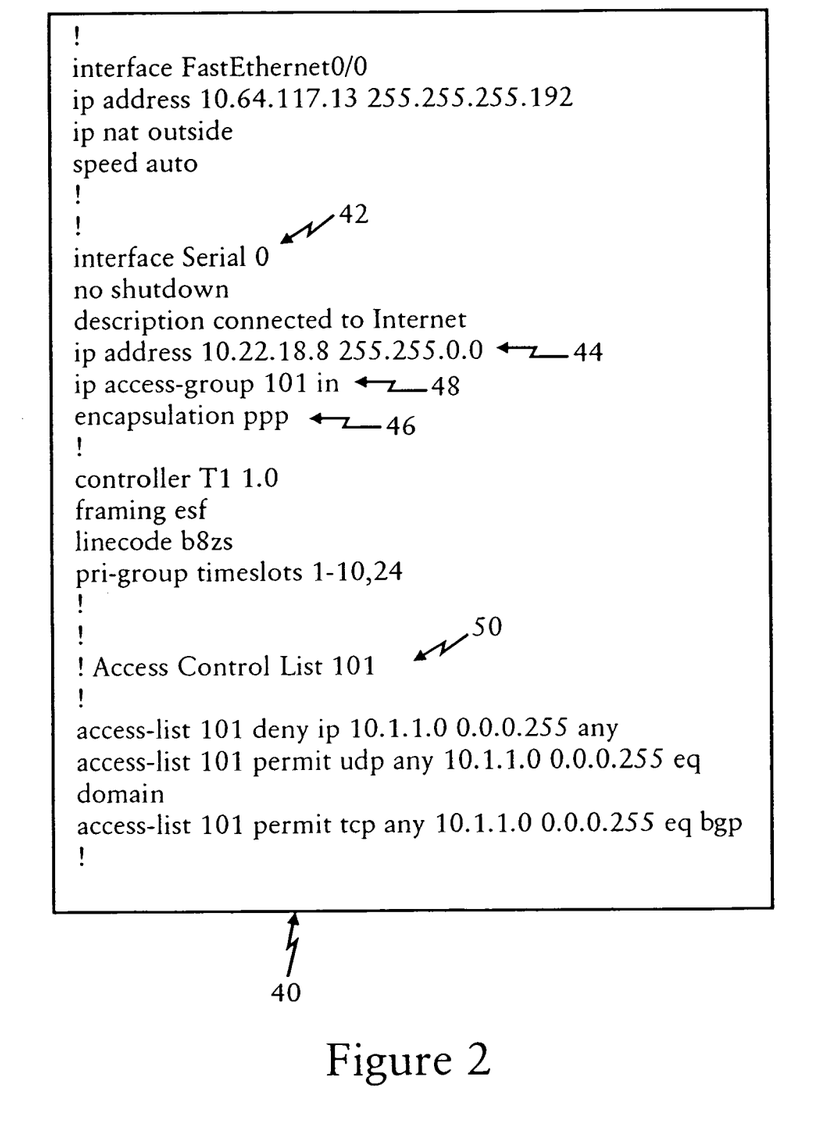
FIG. 2 is a diagram illustrating an object-oriented command hierarchy parsed from a router configuration.

FIG. 2 is a diagram illustrating a typical router configuration 40 retrieved from a router configuration file 32 or transferred via the corresponding router 12. The router configuration 40 comprises of hierarchy of configuration commands that have a parent/child relationship. These commands in combination with independent configuration commands form the router configuration.

As illustrated in FIG. 2, the router configuration 40 includes a serial interface configuration 42 having various associated attributes, including IP address 44, encapsulation type 46 (e.g., PPP) and a policy identifier 48 that specifies the policies which need to be applied to the interface; in this case, the policy identifier 48 specifies an access list "101" for inbound traffic. If the configuration 40 was correlated to an object class, the result would be that the serial interface 42 would be the main class; the serial interface class would have the attributes IP address, encapsulation, and access list policy; and the access list policy 50 would be an independent class which defines the protocols and the traffic to be allowed/denied across the interface and different networks.

Many commands used to control the routers 12, for example Cisco IOS® commands, utilize a variable component that typically needs to be completed by a network administrator, for example: IP address <ip address><subnet mask>. Hence, the "ip address" and the "subnet mask" are the components, i.e., "keys", for which values need to be typically filled by the network administrator.

The configuration parser 16 parses the hierarchal structures of the router configuration 40 and stores the information in a local database 29 as an XML document that specifies the set of interface attributes as key value pairs for each router associated interface configuration parameter, without any loss of integrity of configuration data. In particular, the configuration parser 16 has a set of rules defined within the rule file 28, wherein the object oriented design and organization of the router configuration 40 is defined. The parser 16 parses through the IOS configuration 40, based on object oriented rules specified within the XML rule file 28, and generates for the local database 29 an XML document 60 that includes the key value pairs specifying the necessary content configuration attributes according to the object oriented hierarchy established within the router configuration 40.

Figure 3A:
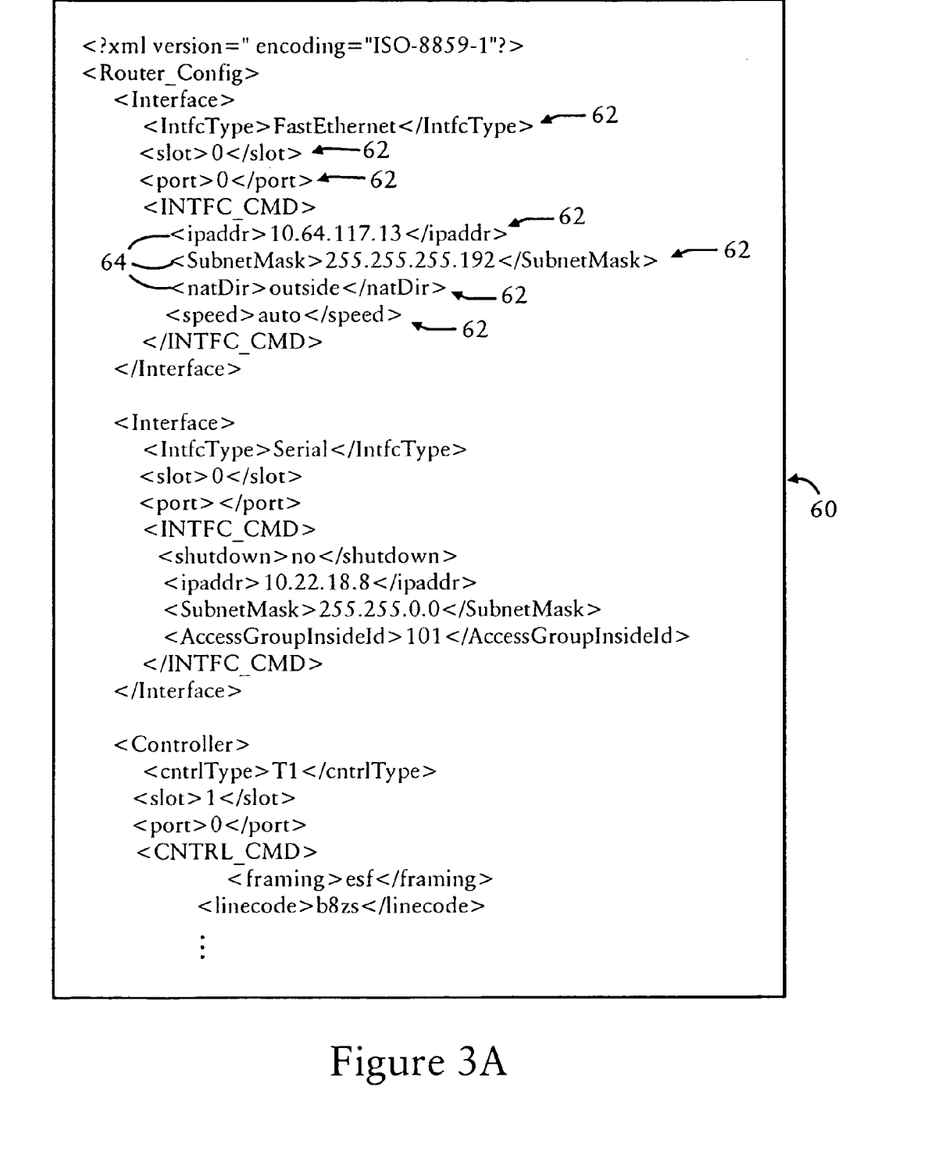
FIGS. 3A and 3B are diagrams summarizing an extensible markup language (XML) document generated by the system of FIG. 1 for representation of the router configuration illustrated in FIG. 2.
Figure 3B:
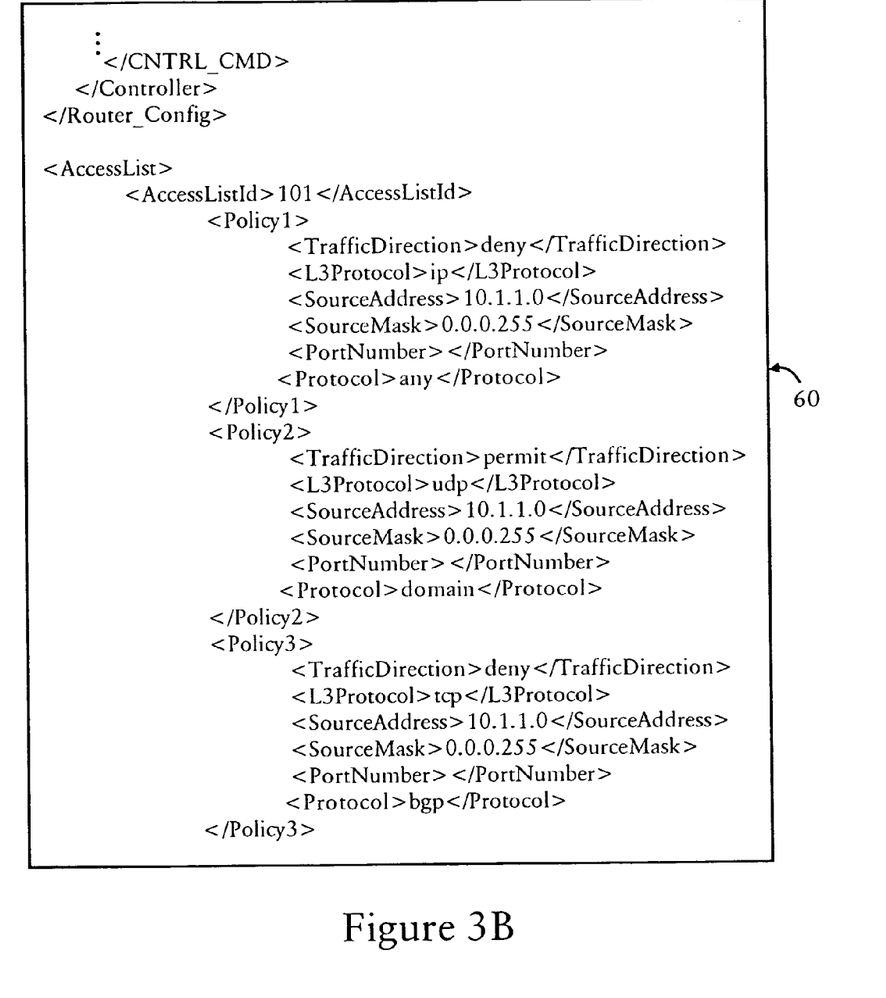

FIGS. 3A and 3B are diagrams summarizing an XML document 60 generated by the configuration parser 16 based on parsing the router configuration 40 illustrated in FIG. 2. The key value pairs for the Fast Ethernet interface configuration illustrated from the example of FIG. 2 and FIGS. 3A and 3B are illustrated in Table 1:

TABLE 1

| Key | Value |
| --- | --- |
| IntfcType | FastEthernet |
| slot | 0 |
| Port | 0 |
| Ipaddr | 10.64.117.13 |
| SubnetMask | 255.255.255.192 |
| natDir | outside |
| Speed | auto |
| CntrlType | T1 |

TABLE 1-continued

| Key | Value |
| --- | --- |
| Slot | 0 |
| Port | 0 |
| Framing | esf |
| AccessListId | 101 |
| TrafficDirection | Deny |
| L3Protocol | IP |
| SourceAddress | 10.1.1.0 |
| SourceMask | 0.0.0.255 |
| Protocol | Bgp |
| ... | ... |

In particular, the leaf XML elements 62 each represent a key value pair, where each element tag 64 itself represents the corresponding key. Hence, the configuration parser 16 generates an XML file 60 each corresponding router configuration 40 for each corresponding router 12, and stores the XML document 60 in the local database 29 for subsequent processing to generate a single aggregated configuration file 14. As described below, the aggregate configuration file 14 includes all the key value pairs for various router configuration commands (e.g., Cisco IOS® configuration commands) that should be generated for the aggregate router 130. The key value pairs will be obtained by aggregating the router configurations 60 from the various router devices 12, and resolving conflicting configurations.

The device analyzer 18 of FIG. 1 is configured for determining, for each router configuration 40, whether a corresponding candidate configuration is available for use by the aggregate router 130. In particular, the device analyzer 18 is configured for reading from the router configuration 40 details such as device model, the version of executable software running on the router 12, whether voice traffic is configured, the type of interfaces, etc. Based on parsing the configuration information from the router configuration 40 for the router 12, the device analyzer 18 accesses a rule file from the rule file storage 28 to make decisions on the most desirable aggregate router configuration (i.e., the candidate configuration) that can be used to replace the given set of low-end routers 12 in terms of the type of interfaces, software version, protocols, etc. If the device analyzer 18 detects a conflict, for example if the router 12 has an ISDN interface and the aggregate router 130 does not support ISDN (as specified by the corresponding XML document stored in the rule file 28), the device analyzer 18 passes the conflict to the conflict resolution engine 20. Once the conflict is resolved, the interface aggregation engine 22 continues aggregating the interfaces for the aggregated router configuration 14.

The conflict resolution resource 20 is configured for selectively determining an availability of a resolved configuration that resolves the conflict detected by any one of the resources 18, 22, or 24. Exemplary conflicts include protocols not being supported in the aggregate router 130, access lists from two routers 12 having the same name or reference, etc. The conflict resolution engine 20 is configured for resolving conflicts that can be handled without disturbing expected functionality; other conflicts such as passwords, boot image name, or key command configurations, can be supplied to the user to enable the user to select an alternative to be used in the aggregate router 130. If certain protocols are not supported, the administrator is notified via a user interface 31, enabling the administrator to make decisions whether the protocol support is required within the new configuration 14, or whether the protocol can be removed.

The following example illustrates how the conflict resolution engine 20 may resolve conflicts, for example in the case of an access control list. Assume that two routers 12 (router A and router B) each reference the same access control list "198" to define their access rules, except that the access control lists are not the same and they have their own respective access policies:

ACL Configured in Router A:

access-list 198 permit icmp 15.0.0.0 0.0.0.255 any access-list 198 permit icmp 202.37.0.0 0.0.255.255 any access-list 198 permit icmp any 202.70.0.0 0.0.255.255 access-list 198 deny icmp any any access-list 198 permit ip any any

ACL configured in Router B:

access-list 198 permit icmp 20.0.0.0 0.0.0.255 any access-list 198 permit icmp 182.122.0.0 0.0.255.255 any access-list 198 deny icmp any any access-list 198 permit ip any any In this example, both Router A and Router B use the same Access Control List (ACL) 198 to define their access rules; however, the ACLs "198" from the respective routers have different access policies. Hence, in this case the configuration aggregation engine 24 would report this conflict to the conflict resolution engine 20, causing the conflict resolution engine 20 to resolve the conflict by combining the two ACLs as follows:

Aggregated ACL:

access-list 199 permit icmp 15.0.0.0 0.0.0.255 any access-list 199 permit icmp 202.37.0.0 0.0.255.255 any access-list 199 permit icmp any 202.70.0.0 0.0.255.255 access-list 199 permit icmp 20.0.0.0 0.0.0.255 any access-list 199 permit icmp 182.122.0.0 0.0.255.255 any access-list 199 deny icmp any any access-list 199 permit ip any any Instances may arise where the conflict resolution engine 20 needs user input via the user interface 31 in order to resolve conflict. For example, consider the following exemplary ACL configurations:

The ACL configured in Router A:

access-list 110 deny ip 207.159.96.00.0.7.255 any access-list 110 deny ip 202.191.128.00.0.1.255 any access-list 110 deny ip 202.191.144.0 0.0.1.255 any access-list 110 permit ip any any The ACL configured in Router B:

access-list 110 deny ip 207.159.96.0 0.0.7.255 19.0.0.0 0.255.255.255 access-list 110 deny ip 218.23.23.0 0.0.0.255 any access-list 110 deny ip 102.191.144.0 0.0.1.255 any access-list 110 deny ip 162.171.0.0 0.0.255.255 any access-list 110 permit ip any any In this example, Router A blocks any IP traffic from the network having the address "207.159.96.0", whereas Router B blocks only the IP packets from the network having the address "207.159.96.0" and which have their destination for the network having the address "19.0.0.0". In this case, any decision made by the conflict resolution resource 20 may not be fully effective, hence the conflict resolution resource 20 will initiate an interactive session with the user via the user interface 31, enabling the user to provide the actual destination addresses that need to be blocked.

The interface aggregation engine 22 is configured for aggregating the configurations 40 from the routers 12 into the aggregate configuration 14 for use by the aggregate router 130. Different types of aggregation scenarios may be processed by the interface aggregation engine 22, namely: aggregating similar subscriber interface modules from a low end router to an aggregate router 130; aggregating low speed/density subscriber modules of the low end router to an aggregate router 130; and migrating unsupported subscriber interface modules in low end routers 12 to the aggregate router 130. In the case of aggregating similar subscriber interface modules from a low end router 12 to an aggregate router 130, the interface configuration can be mapped with its existing configuration parameters to the aggregate router 130, for example an OC-12C Asynchronous Transfer Mode (ATM) interface configuration utilized by a Cisco 7000 series router can be transferred to an OC-12C ATM line card in the Cisco 10000 series router (representing the aggregate router 130) without any change.

The case of aggregating the low speed/density subscriber modules of the low end router to an aggregate router 130 is the most expected scenario in migration. In particular, many low speed subscriber lines will be aggregated at the edge router location for the aggregate router 130. In this case, the router configuration aggregation resource 22 analyzes the interface configuration 60 and proposes an aggregate mapping for the low speed interfaces to a corresponding subscriber interface module of the aggregate router 130. The proposed configuration can be accepted, rejected, or selectively modified by a systems engineer via the user interface 31 prior to implementation of the aggregate configuration 14.

For example, many routers 12 that lease DS1 and DS3 channels to subscribers can be replaced with a single aggregate router 130 having a line card that can terminate hundreds of DS1 circuits, all carried by a single optical fiber. Each of the existing routers 12 have time slots configured for the T1/T3 interfaces. The goal will be to migrate the channel time slots transparently from the multiple routers 12 for a single high-density channel and the entry router. Hence, the interface aggregation engine 22, based on rules specified within the rule file 28, will aggregate the interfaces of the routers to an interface of the aggregate router 130 based on bandwidth requirements and availability.

The configuration aggregation engine 24 is configured for aggregating configuration parameters and any resolved configurations supplied by the conflict resolution engine 20, according to the determined configuration hierarchy, on a feature by feature basis (e.g., Layer 3 configuration, routing, NAT, ACLs, firewalls, etc.). In particular, the configuration aggregation engine 24 aggregates features such as access control lists (ACLs), route maps, routing protocols, etc. For example, route maps and access control list may be identified by commonly used names within the domain of the corresponding router 12; as described above, however, if access lists are found to overlap or a shared the same ACL number using different access rules, the configuration aggregation engine 24 interacts with the conflict resolution engine 20 for renumbering of access control lists as needed. Note that the configuration aggregation resource 24 may be configured for requiring user verification to ensure that configuration weaknesses to the arise due to a lack of a proper policy.

FIGS. 4A and 4B are diagrams illustrating examples of XML-based rule documents 70a, 70b, that correlate prescribed router configurations with available router configurations for the aggregate router 130. For example, the document 70a of FIG. 4A illustrates a rule document that specifies the available router configurations for the aggregate router 130, illustrated as a Cisco 10008 ("C10008") router. In particular, the rule document 70a includes attributes 72a that specify line cards that can be directly mapped from an existing router 12 to the aggregate router 130, attributes 72b that specify subscriber interfaces that can be aggregated, attributes 72c that specify trunk interfaces that can be aggregated, and attributes 72d that specify command keys that can be aggregated. The rule document 70a also includes attributes 72e that specify commands that are not supported by the aggregate router 130, including for example certain frame relay-based commands 74a, certain PPP commands 74b, or certain multilink PPP commands 74c.

FIG. 4B illustrates a rule document 70b specifying attributes of one of the existing routers 12 to be aggregated, for example a Cisco 7600 ("C7600") router. As illustrated in FIG. 4B, the rule file 70b includes a software revision tag 76 that specifies a minimum software version that is needed before the interfaces for the corresponding router 12 can be aggregated, and line card tags 78 that specify prescribed interfaces for the router 12 that are to be aggregated (e.g., T1, T3, OC-12). The rule document 70b also includes an unsupported command tag 80 for specifying any commands within the corresponding router 12 that may not be supported by the aggregate router 130.

Hence, for each type of device that will be handled by the aggregation resource 10, a corresponding rule document 70 will be stored within the rule file 28. Hence, as the aggregation system 10 is attempting to configure the aggregate router 130 for a certain feature, the corresponding rule document (e.g., 70a) will be accessed from the rule file 28 to check if the interfaces can be aggregated, followed by IOS commands which can be aggregated, etc. Any of the aggregation resources, including the interface aggregation engine 22, the configuration aggregation engine 24, or the conflict resolution engine 20, may access the rule file 28 to access a selected rule document (e.g., 70a, 70b) to identify how to map interfaces from the existing routers 12 to the aggregate router 130.

Once the interface aggregation engine 22 and the configuration aggregation engine 24 have completed the aggregation of the hardware interface and the policy/protocol configuration parameters, the configuration generator 26 is configured for generating the single router configuration 14 as an executable file, for example as a Cisco IOS® file, for use by the aggregate router 130. The user can then verify the aggregate configuration file 14 and deliver it to the aggregate router 130 to complete deployment of the aggregated router operations within the aggregate router 130.

Figure 5:
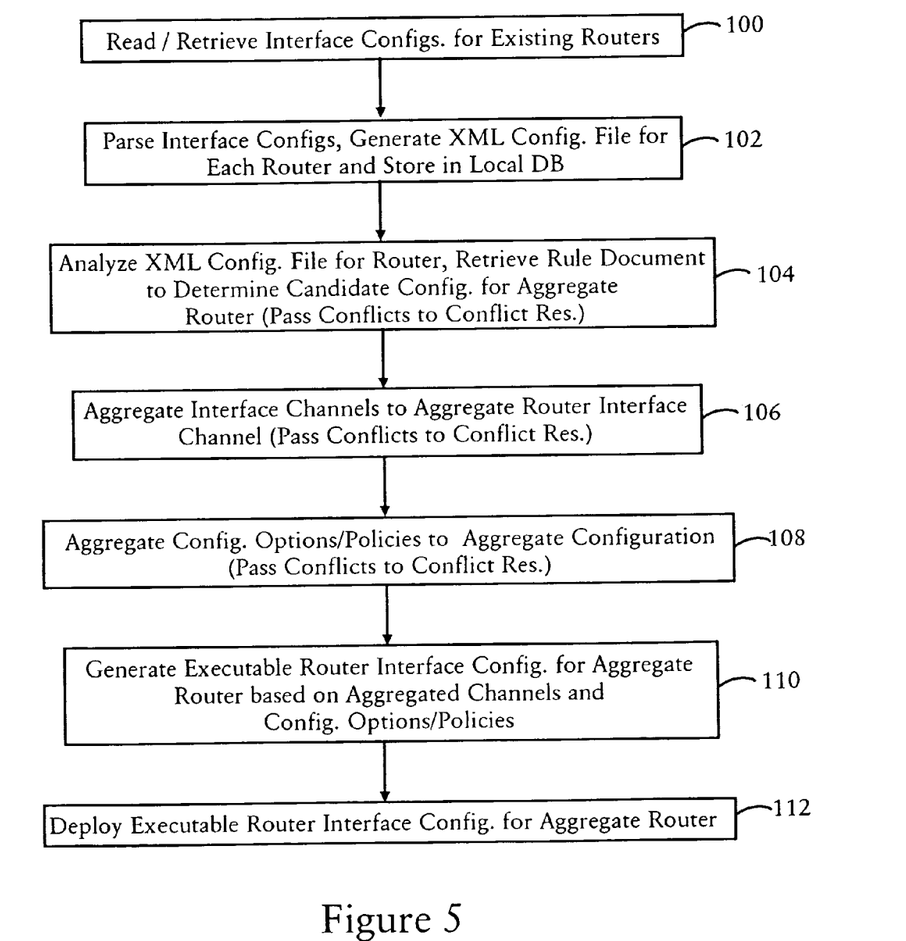
FIG. 5 is a diagram illustrating the method by the system of FIG. 1 of aggregating the multiple router configurations into a single router configuration, according to an embodiment of the present invention.

FIG. 5 is a diagram summarizing the method of aggregating router operations by the aggregation resource 10, according to an embodiment of the present invention. The steps described in FIG. 5 can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

Figure 6:
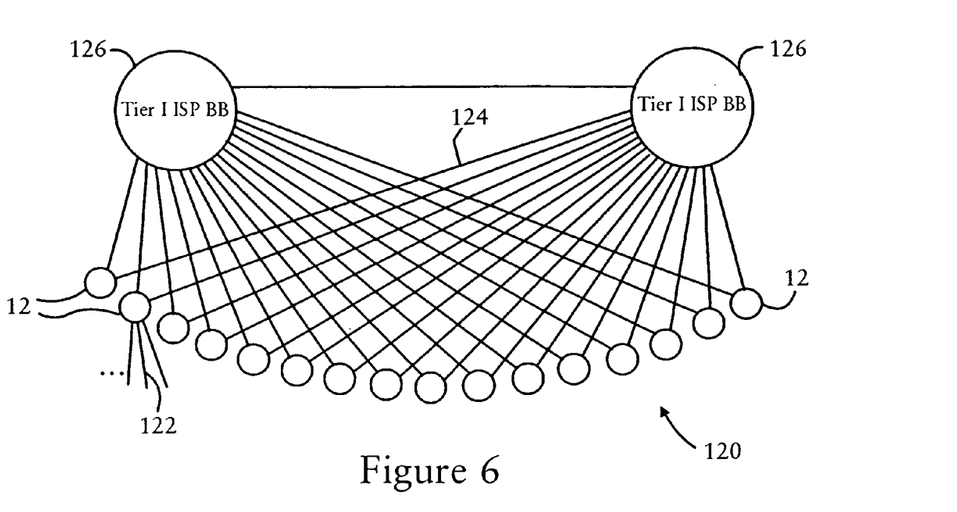
FIG. 6 is a diagram illustrating a network topology prior to aggregation.

The method begins in step 100, where the configuration parser 16 determines the router configurations for the existing routers 12, for example by reading a prescribed configuration file 32, or by discovering the identified group of routers via the device discovery resource 36, and accessing the router configurations from each corresponding identified router 12. For example, FIG. 6 illustrates a network 120 having multiple routers 12, for example Cisco 7513 Access Routers, configured for providing DS0 subscriber links 122 and OC3 trunk links 124 to Tier 1 internet service provider (ISP) backbone nodes 126.

The configuration parser 16 parses in step 102 each of the router configurations 40, as described above with respect to FIG. 2, and generates a corresponding XML document 60 as illustrated in FIGS. 3A and 3B that describes the router configuration for the corresponding router 12. The configuration parser 16 parses and stores the generated XML document 60 in the local database 29.

The device analyzer 18 analyzes in step 104 the XML configuration file 60 for each corresponding router 12, and retrieves the corresponding rule document 70b to identify the associated attributes and rules for the corresponding router 12. The device analyzer 18 also searches for an available rule document 70a to determine the best available configuration for use by an available aggregate router. If the device analyzer 18 detects a conflict, the conflict is provided to the conflict resolution engine 20; if the conflict resolution engine 20 cannot automatically resolve the conflict, user intervention may be required by the user interface 31.

Once a candidate aggregate router and candidate configuration has been identified, the interface aggregation engine 22 aggregates in step 106 the existing configurations for existing routers 12, as represented by the corresponding XML document 60, into an aggregate router interface channel available in the aggregate router 130; any conflicts detected by the interface aggregation engine 22 are passed to the conflict resolution engine 20 to resolve the conflict with a resolved configuration. Concurrently the configuration aggregation engine 24 aggregates in step 108 the configuration options and policies for the respective routers 12 into an aggregate configuration, where any conflicts detected by the configuration aggregation engine 24 are passed to the conflict resolution engine 20 for resolution.

Completion of steps 106 and 108 by the interface aggregation engine 22 and the configuration aggregation engine 24, respectively, enables the configuration generator 26 to generate in step 110 the executable router configuration 14 for the aggregate router 130 based on the aggregated channels and configuration options and policies. The executable router configuration 14 can then be deployed in step 112 for execution by the aggregate router 130, resulting in the network of FIG. 7.

Figure 7:
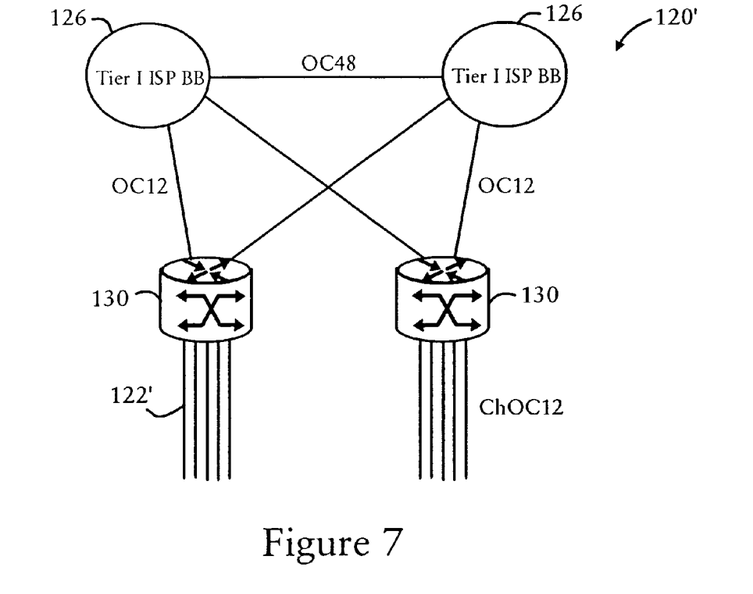
FIG. 7 is a diagram illustrating the network of FIG. 6 following aggregation by the system of FIG. 1.

As shown in FIG. 7, the generation of the aggregated router configuration 14 by the aggregation resource 10 enables the routers 12 in the network 120 of FIG. 6 to be replaced in the network 120' with a pair of aggregate routers 130, for example Cisco series 10000 routers providing subscriber links 122' via channelized OC12 channels and aggregated OC12 trunk lines 124'. The aggregation from FIG. 6 to FIG. 7 can thus be accomplished using the automated rule-based migration system 10 with minimal user involvement. Note that the illustration of two aggregate routers is to provide network redundancy; each aggregate router 130 includes the same configuration file 14, enabling either router 130 to continue service in the event the other router 130 fails.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an executable system configured for accessing routers according to Internet Protocol (IP), the method comprising:

determining, for each of an identified group of routers, a corresponding group of router configurations used for providing a corresponding group of router operations, each router including physical subscriber link interfaces and a physical trunk link interface;

determining, for each router configuration, whether a corresponding candidate configuration is available for use by an aggregate router, having an aggregate router physical trunk link interface and aggregate router physical subscriber link interfaces, and that configures the aggregate router for aggregating the router operations, the physical subscriber link interfaces, and the physical trunk link interfaces for the identified group of routers;

detecting whether a conflict exists between one of the router configurations and the corresponding candidate configuration;

selectively determining an availability of a resolved configuration that resolves the conflict for the one router configuration, enabling execution of the corresponding router operation by the aggregate router; and generating a single router configuration, for use by the aggregate router in aggregating the router operations of the identified group of routers, based on the determined candidate configurations and the resolved configurations, the single router configuration aggregating the physical trunk link interfaces of the identified group of routers into the aggregate router physical trunk link interface and aggregating the physical subscriber link interfaces of the identified group of routers into the aggregate router physical subscriber link interfaces.

2. The method of claim 1, wherein the determining of the group of router configurations includes:

discovering the identified group of routers based on execution of a network discovery resource; and accessing the group of router configurations from each corresponding identified router.

3. The method of claim 1, wherein the determining of the group of router configurations includes reading the group of router configurations for a corresponding one of the identified routers from a tangible medium.

4. The method of claim 1, wherein the determining of the group of router configurations includes:

parsing the router configurations for the corresponding group; and generating, for each router configuration of the corresponding group, a first extensible markup language (XML) document that specifies a corresponding set of interface attributes as key value pairs for each router associated router configuration parameter based on a determined configuration hierarchy within the router configuration; and storing the first XML document for said each router configuration in a local database.

5. The method of claim 4, wherein the determining of a candidate configuration includes:

accessing, from a rule file configured for storing XML-based rule documents that correlate prescribed router configurations associated with the identified group of routers with available router configurations for the aggregate router, at least one of the XML-based rule documents based on parsing the XML document generated for the corresponding determined router configuration; and determining the candidate configuration based on the at least one XML-based rule document.

6. The method of claim 5, wherein the detecting whether a conflict exists includes:

identifying whether the at least one XML-based rule document includes a tag rule that specifies that one of the router associated router configuration parameters identified by the corresponding first XML document is not supported by the aggregate router; and identifying whether one of the router associated router configuration parameters has a value that conflicts with a corresponding value for use in the single router configuration.

7. The method of claim 6, wherein the selectively determining an availability of a resolved configuration includes:

if the one router associated router configuration parameter is not supported by the aggregate router, determining whether an alternative configuration for the corresponding router operation is available for use by the aggregate router;

if no alternative configuration is available, prompting a user for the resolved configuration.

8. The method of claim 6, wherein the selectively determining an availability of a resolved configuration includes if one of the router associated router configuration parameters has a value that conflicts with a corresponding value for use in the single router configuration, selecting an alternative value that does not conflict with the single router configuration.

9. The method of claim 8, wherein the selecting an alternative value includes changing an access list rule identifier, used for specifying access list policy for the corresponding router configuration, to a modified access list rule identifier that does not conflict with the single router configuration.

10. The method of claim 4, wherein the generating a single router configuration includes:

aggregating the determined candidate configurations and any resolved configurations for the identified group of routers into an aggregated configuration for the respective aggregated router operations, according to the determined configuration hierarchy; and generating the single router configuration, including access to the aggregated configuration, as an executable resource for execution by the aggregate router.

11. An executable system configured for accessing routers according to Internet Protocol (IP), the system comprising:

a router configuration parser configured for determining, for each of an identified group of routers, a corresponding group of router configurations used for providing a corresponding group of router operations, each router including physical subscriber link interfaces and a physical trunk link interface;

a device analyzer configured for determining, for each router configuration, whether a corresponding candidate configuration is available for use by an aggregate router, having an aggregate router physical trunk link interface and aggregate router Physical subscriber link interfaces, and that configures the aggregate router for aggregating the router operations, the physical subscriber link interfaces, and the physical trunk link interfaces for the identified group of routers, the device analyzer configured for detecting whether a conflict exists between one of the router configurations and the corresponding candidate configuration;

a conflict resolution resource configured for selectively determining an availability of a resolved configuration that resolves the conflict for the one router configuration, enabling execution of the corresponding router operation by the aggregate router; and an aggregation resource configured for generating a single router configuration, for use by the aggregate router in aggregating the router operations of the identified group of routers, based on the determined candidate configurations and the resolved configurations, the single router configuration aggregating the physical trunk link interfaces of the identified group of routers into the aggregate router physical trunk link interface and aggregating the physical subscriber link interfaces of the identified group of routers into the aggregate router physical subscriber link interfaces.

12. The system of claim 11, wherein the router configuration parser is configured for determining the group of router configurations based on discovering the identified group of routers based on execution of a network discovery resource, the router configuration parser configured for accessing the group of router configurations from each corresponding identified router.

13. The system of claim 11, wherein the router configuration parser is configured for reading the group of router configurations for a corresponding one of the identified routers from a tangible medium.

14. The system of claim 11, wherein the router configuration parser is configured for:

parsing the router configurations for the corresponding group;

generating, for each router configuration of the corresponding group, a first extensible markup language (XML) document that specifies a corresponding set of interface attributes as key value pairs for each router associated router configuration parameter based on a determined configuration hierarchy within the router configuration; and storing the first XML document for said each router configuration in a local database.

15. The system of claim 14, further comprising:

a rule file configured for storing XML-based rule documents that correlate prescribed router configurations associated with the identified group of routers with available router configurations for the aggregate router;

the device analyzer configured for accessing at least one of the XML-based rule documents from the rule file based on parsing the XML document generated for the corresponding determined router configuration;

the device analyzer configured for determining the candidate configuration based on the at least one XML-based rule document.

16. The system of claim 15, wherein the device analyzer is configured for detecting whether a conflict exists based on:

identifying whether the at least one XML-based rule document includes a tag rule that specifies that one of the router associated router configuration parameters identified by the corresponding first XML document is not supported by the aggregate router; and identifying whether one of the router associated router configuration parameters has a value that conflicts with a corresponding value for use in the single router configuration.

17. The system of claim 16, wherein the conflict resolution resource is configured for selectively determining an availability of a resolved configuration based on:

if the one router associated router configuration parameter is not supported by the aggregate router, determining whether an alternative configuration for the corresponding router operation is available for use by the aggregate router;

if no alternative configuration is available, prompting a user for the resolved configuration.

18. The system of claim 16, wherein the conflict resolution resource, in response to determining that one of the router associated router configuration parameters has a value that conflicts with a corresponding value for use in the single router configuration, selects an alternative value that does not conflict with the single router configuration.

19. The system of claim 18, wherein the conflict resolution resource is configured for changing an access list rule identifier, used for specifying an access list policy for the corresponding router configuration, to a modified access list rule identifier that does not conflict with the single router configuration.

20. The system of claim 14, wherein the aggregation resource includes:

a configuration aggregation resource configured for aggregating the determined candidate configurations and any resolved configurations for the identified group of routers into an aggregated configuration for the respective aggregated router operations, according to the determined configuration hierarchy; and a configuration generator configured for generating the single router configuration, including access to the aggregated configuration, as an executable resource for execution by the aggregate router.

21. A computer readable medium having stored thereon sequences of instructions for generating a single router configuration for an aggregate router, the sequences of instructions including instructions for performing the steps of:

determining, for each of an identified group of routers, a corresponding group of router configurations used for providing a corresponding group of router operations, each router including physical subscriber link interfaces and a physical trunk link interface;

determining, for each router configuration, whether a corresponding candidate configuration is available for use by an aggregate router, having an aggregate router Physical trunk link interface and aggregate router physical subscriber link interfaces, and that configures the aggregate router for aggregating the router operations, the physical subscriber link interfaces, and the physical trunk link interfaces for the identified group of routers;

detecting whether a conflict exists between one of the router configurations and the corresponding candidate configuration;

selectively determining an availability of a resolved configuration that resolves the conflict for the one router configuration, enabling execution of the corresponding router operation by the aggregate router; and generating a single router configuration, for use by the aggregate router in aggregating the router operations of the identified group of routers, based on the determined candidate configurations and the resolved configurations, the single router configuration aggregating the physical trunk link interfaces of the identified group of routers into the aggregate router physical trunk link interface and aggregating the physical subscriber link interfaces of the identified group of routers into the aggregate router physical subscriber link interfaces.

22. The medium of claim 21, wherein the determining of the group of router configurations includes:

discovering the identified group of routers based on execution of a network discovery resource; and accessing the group of router configurations from each corresponding identified router.

23. The medium of claim 21, wherein the determining of the group of router configurations includes reading the group of router configurations for a corresponding one of the identified routers from a tangible medium.

24. The medium of claim 21, wherein the determining of the group of router configurations includes:

parsing the router configurations for the corresponding group; and generating, for each router configuration of the corresponding group, a first extensible markup language (XML) document that specifies a corresponding set of interface attributes as key value pairs for each router associated router configuration parameter based on a determined configuration hierarchy within the router configuration; and storing the first XML document for said each router configuration in a local database.

25. The medium of claim 24, wherein the determining of a candidate configuration includes:

accessing, from a rule file configured for storing XML-based rule documents that correlate prescribed router configurations associated with the identified group of routers with available router configurations for the aggregate router, at least one of the XML-based rule documents based on parsing the XML document generated for the corresponding determined router configuration; and determining the candidate configuration based on the at least one XML-based rule document.

26. The medium of claim 25, wherein the detecting whether a conflict exists includes:

identifying whether the at least one XML-based rule document includes a tag rule that specifies that one of the router associated router configuration parameters identified by the corresponding first XML document is not supported by the aggregate router; and identifying whether one of the router associated router configuration parameters has a value that conflicts with a corresponding value for use in the single router configuration.

27. The medium of claim 26, wherein the selectively determining an availability of a resolved configuration includes:

if the one router associated router configuration parameter is not supported by the aggregate router, determining whether an alternative configuration for the corresponding router operation is available for use by the aggregate router;

if no alternative configuration is available, prompting a user for the resolved configuration.

28. The medium of claim 26, wherein the selectively determining an availability of a resolved configuration includes if one of the router associated router configuration parameters has a value that conflicts with a corresponding value for use in the single router configuration, selecting an alternative value that does not conflict with the single router configuration.

29. The medium of claim 28, wherein the selecting an alternative value includes changing an access list rule identifier, used for specifying an access list policy for the corresponding router configuration, to a modified access list rule identifier that does not conflict with the single router configuration.

30. The medium of claim 24, wherein the generating a single router configuration includes:

aggregating the determined candidate configurations and any resolved configurations for the identified group of routers into an aggregated configuration for the respective aggregated router operations, according to the determined configuration hierarchy; and generating the single router configuration, including access to the aggregated configuration, as an executable resource for execution by the aggregate router.

31. An executable system configured for accessing routers according to Internet Protocol (IP), the system comprising:

means for determining, for each of an identified group of routers, a corresponding group of router configurations used for providing a corresponding group of router operations, each router including physical subscriber link interfaces and a physical trunk link interface;

means for determining, for each router configuration, whether a corresponding candidate configuration is available for use by an aggregate router, having an aggregate router physical trunk link interface and aggregate router physical subscriber link interfaces, and that configures the aggregate router for aggregating the router operations, the physical subscriber link interfaces, and the physical trunk link interfaces for the identified group of routers;

means for detecting whether a conflict exists between one of the router configurations and the corresponding candidate configuration;

means for selectively determining an availability of a resolved configuration that resolves the conflict for the one router configuration, enabling execution of the corresponding router operation by the aggregate router; and means for generating a single router configuration, for use by the aggregate router in aggregating the router operations of the identified group of routers, based on the determined candidate configurations and the resolved configurations, the single router configuration aggregating the physical trunk link interfaces of the identified group of routers into the aggregate router physical trunk link interface and aggregating the physical subscriber link interfaces of the identified group of routers into the aggregate router physical subscriber link interfaces.

32. The system of claim 31, wherein the means for determining of the group of router configurations is configured for:
- discovering the identified group of routers based on execution of a network discovery resource; and
- accessing the group of router configurations from each corresponding identified router.

33. The system of claim 31, wherein the means for determining of the group of router configurations is configured for reading the group of router configurations for a corresponding one of the identified routers from a tangible medium.

34. The system of claim 31, wherein the means for determining of the group of router configurations is configured for:
- parsing the router configurations for the corresponding group;
- generating, for each router configuration of the corresponding group, a first extensible markup language (XML) document that specifies a corresponding set of interface attributes as key value pairs for each router associated router configuration parameter based on a determined configuration hierarchy within the router configuration; and
- storing the first XML document for said each router configuration in a local database.

35. The system of claim 34, wherein the means for determining a candidate configuration is configured for:
- accessing, from a rule file configured for storing XML-based rule documents that correlate prescribed router configurations associated with the identified group of routers with available router configurations for the aggregate router, at least one of the XML-based rule documents based on parsing the XML document generated for the corresponding determined router configuration; and
- determining the candidate configuration based on the at least one XML-based rule document.

36. The system of claim 35, wherein the means for detecting whether a conflict exists is configured for:
- identifying whether the at least one XML-based rule document includes a tag rule that specifies that one of the router associated router configuration parameters identified by the corresponding first XML document is not supported by the aggregate router; and
- identifying whether one of the router associated router configuration parameters has a value that conflicts with a corresponding value for use in the single router configuration.

37. The system of claim 36, wherein the means for selectively determining an availability of a resolved configuration is configured for:
- if the one router associated router configuration parameter is not supported by the aggregate router, determining whether an alternative configuration for the corresponding router operation is available for use by the aggregate router;
- if no alternative configuration is available, prompting a user for the resolved configuration.

38. The system of claim 36, wherein the means for selectively determining an availability of a resolved configuration is configured for selecting an alternative value that does not conflict with the single router configuration if one of the router associated router configuration parameters has a value that conflicts with a corresponding value for use in the single router configuration.

39. The system of claim 38, wherein the means for selecting an alternative value is configured for changing an access list rule identifier, used for specifying an access list policy for the corresponding router configuration, to a modified access list rule identifier that does not conflict with the single router configuration.

40. The system of claim 34, wherein the means for generating a single router configuration is configured for:
- aggregating the determined candidate configurations and any resolved configurations for the identified group of routers into an aggregated configuration for the respective aggregated router operations, according to the determined configuration hierarchy; and
- generating the single router configuration, including access to the aggregated configuration, as an executable resource for execution by the aggregate router.

* * * * *